Patented June 28, 1932

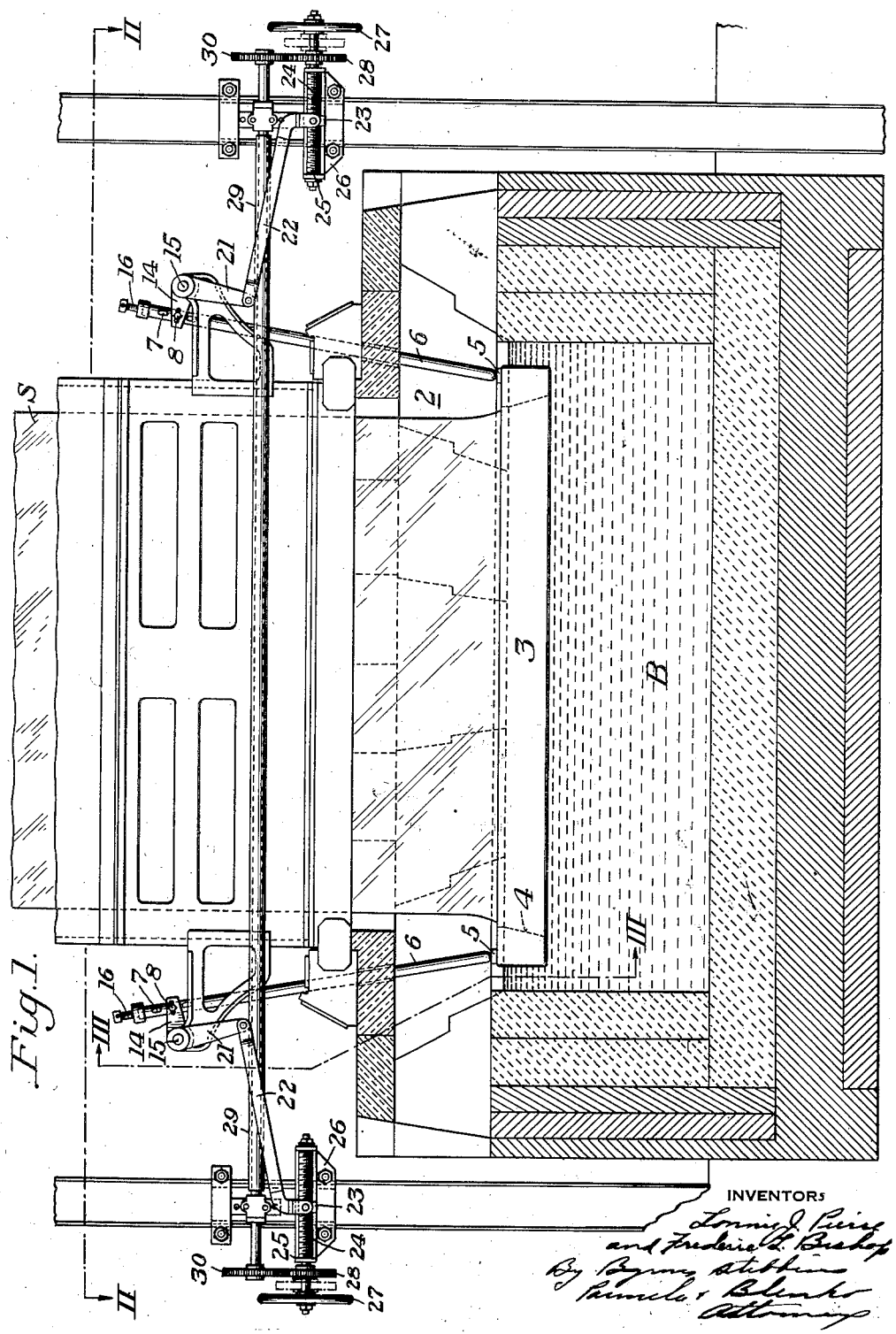

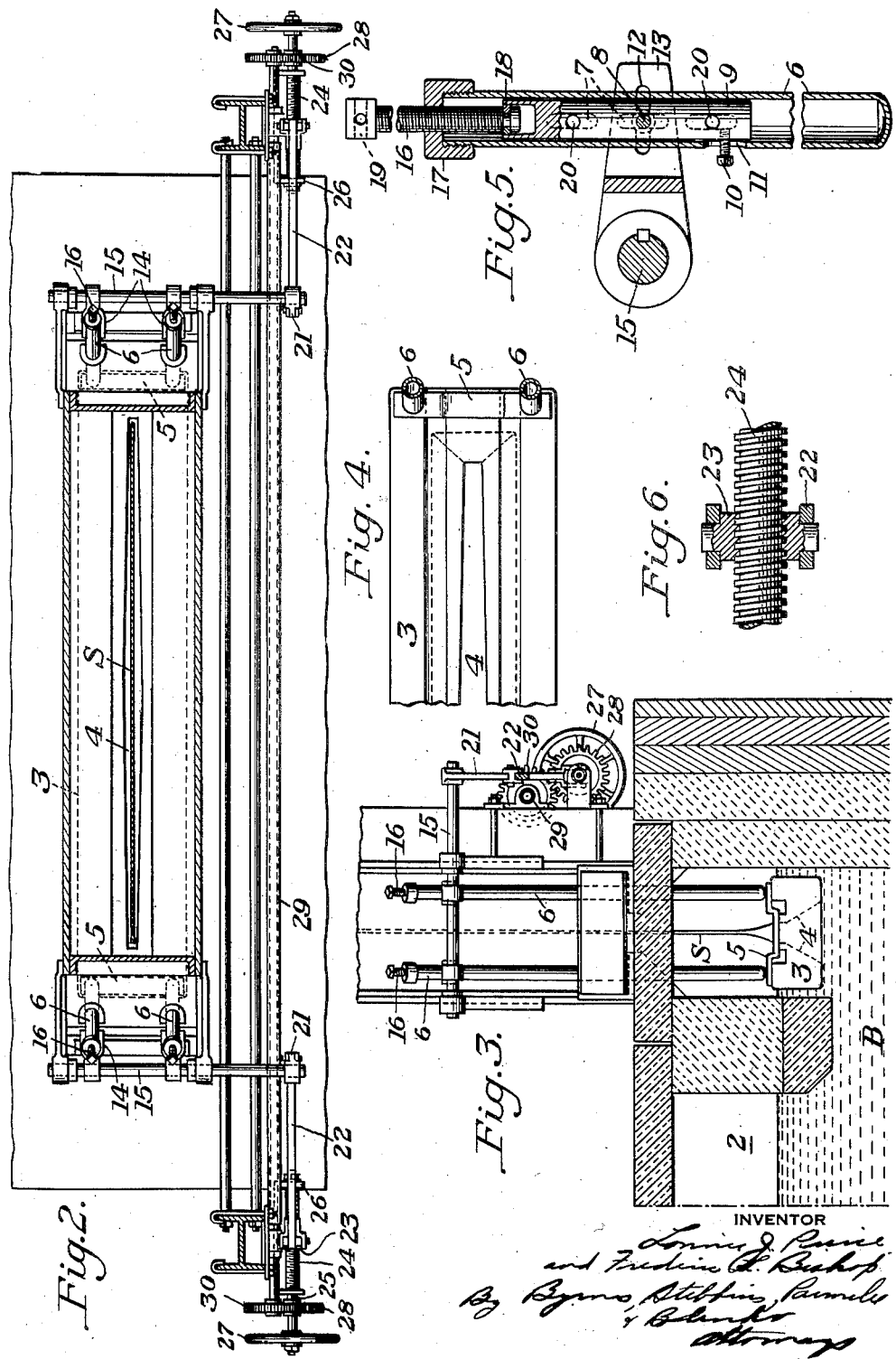

1,864,930

UNITED STATES PATENT OFFICE

LONNIE J. PIERCE AND FREDERIC L. BISHOP, OF PITTSBURGH, PENNSYLVANIA, ASSIGNORS TO AMERICAN WINDOW GLASS COMPANY, OF PITTSBURGH, PENNSYLVANIA, A CORPORATION OF PENNSYLVANIA

GLASS DRAWING APPARATUS

Application filed July 26, 1930. Serial No. 470,821.

Our invention relates to a glass drawing apparatus and particularly to an apparatus for use in those glass drawing processes employing a floater or debiteuse through which the glass is drawn, for example, the Fourcault process.

In the Fourcault process, a clay floater or debiteuse is partially depresed in a bath of molten glass. It is depressed to such an extent that the molten glass wells upwardly through a slot located therein. The glass is then drawn off in sheet form by draft rollers.

It is essential that the floater be submerged the proper amount and positioned in the proper manner. The usual form of depressing apparatus often proves quite unsatisfactory in that the floater is not depressed the same amount at each end, or the proper end level is not maintained under adjustment.

We provide means whereby the floater or debiteuse may be raised or depressed uniformly on all sides simultaneously, and means whereby the adjustment may be accomplished at either end of the drawing chamber. We further provide means whereby either end of the floater may be raised or lowered from either end of the drawing chamber where the adjustment stations are usually located.

In the accompanying drawings we have shown for purposes of illustration only, a preferred embodiment of our invention.

In the accompanying drawings,

Figure 1 is a transverse section through a drawing chamber, a floater and depressing device being shown in elevation;

Figure 2 is a horizontal section taken on the line II—II of Figure 1;

Figure 3 is a longitudinal section on the line III—III of Figure 1;

Figure 4 is a top plan view of an end portion of a floater showing the engagement thereof by the depressing device;

Figure 5 is a longitudinal section through one of the posts employed for depressing the floater; and Figure 6 is a detail view of a connection employed for adjusting the posts.

Referring to the drawings, there is shown a glass drawing chamber indicated generally by the reference character 2, which contains in the lower portion thereof a bath B of molten glass. A floater 3, which is usually made of clay, is partially submerged in the bath B. The floater is provided with a slot 4 through which the molten glass wells upwardly and is drawn off in the form of a sheet S by draft rollers (not shown).

Each end of the floater is provided with a bearing plate 5 upon which rests a plurality of hollow posts 6, by means of which the floater is raised or lowered. The posts 6 are slidable in the framework of the machine, as best shown in Figures 1 and 2. The posts 6 are provided at their upper ends with a plurality of slots 7, any one of which may receive a cross pin 8.

A block 9, having holes 20 therein for the reception of the cross pins 8, is slidably mounted in the hollow post 6. The degree of movement of the block 9 is determined by a screw 10 operating in an opening 11 in the side of the posts 6.

The cross pin 8 extends through openings 12 in the arms 13 of the yoke 14, which is keyed to a shaft 15. The block 9 is normally held in fixed position by means of a screw 16 threaded in the cap 17 of the post 6 and attached to the block 9 by means of a slotted lower portion which engages the washer 18. The screw 16 has a capstan head 19 for purposes of adjustment. This individual adjustment means provided for each post 6 is no part of our invention, but is described and claimed in the copending application of Henry F. Clark, Serial No. 453,556, filed May 19, 1930.

There is a shaft 15 for each end of the machine. It will be apparent that rocking of these shafts will operate to raise or lower the posts 6 and consequently raise or lower the floater 3.

Each shaft 15 is provided with an arm 21 keyed thereto. A link 22 is pivotally attached to the arm 21. The link 22 is yoked at one end so as to accommodate a nut 23 trunnioned in the yoke. Each nut 23 is threaded on a threaded portion 24 of a shaft 25 rotatable in a bracket 26. Each shaft has keyed thereto a wheel 27. Each shaft 25 also has featherkeyed thereto a gear 28. The shafts 25 are connected together by means of a cross shaft 29 having gears 30 thereon which cooperate with the gears 28 on the shafts 25.

With both the gears 28 in cooperative relation with the gears 30 on the cross shaft 29 as shown in the solid line position on Figure 1, rotation of either wheel 27 will be effective for simultaneously and equally rotating the two shafts 25, rocking the shafts 15 through the links 22 and the arms 21, and effecting an upward or downward movement of the several posts 6.

If it is desired to raise or lower one side only of the floater, this may be done by disengaging the gears 28 and 30 by moving gear 28 to the position shown in dotted lines on Figure 1 on the adjacent side and operating the adjacent hand-wheel.

If it is desired to depress or raise one corner of the floater only, the screw 16 on the post 6 adjacent that corner may be individually adjusted to obtain the desired result, as described in the copending application of Henry F. Clark, Serial No. 453,556, filed May 19, 1930, above referred to.

While we have described and shown a preferred embodiment of our invention, it will be understood that it is not to be limited thereto but may be otherwise embodied within the scope of the following claims.

We claim:

1. In combination with a floater for glass drawing, means for simultaneously adjusting all edges of the floater and for holding the floater in such adjusted position.

2. In combination with a floater for glass drawing, means for simultaneously adjusting all edges of the floater equally and for holding the floater in such adjusted position.

3. In combination with a floater for glass drawing, a plurality of depressing devices and means for equally and simultaneously adjusting the several depressing devices.

4. Glass drawing apparatus comprising a drawing chamber, a floater therein, posts extending into the chamber and engaging the floater, and means for simultaneously and equally adjusting the posts whereby all edges of the floater may be adjusted equally.

5. Glass drawing apparatus comprising a drawing chamber, a floater therein, a plurality of depressing devices, and means for adjusting any one or more of the depressing devices from either side of the chamber.

6. Apparatus for depressing a floater for glass drawing, comprising a plurality of sets of posts engaging the floater, and means for simultaneously and equally adjusting each set of posts from either side of the chamber.

7. Apparatus for depressing a floater for glass drawing comprising a plurality of posts engaging each end of the floater, a shaft at each end of the chamber, links connecting the posts to the adjacent shaft, and separate screw means operatively connected to each shaft for rocking the same.

8. Apparatus for depressing a floater for glass drawing comprising a plurality of posts engaging each end of the floater, a shaft at each end of the chamber, links connecting the posts to the adjacent shaft, separate screw means operatively connected to each shaft for rocking the same, a cross shaft connecting said screw means, and gearing whereby either shaft may be rocked by either screw means.

9. Apparatus for depressing a floater for glass drawing comprising a plurality of posts engaging each end of the floater, a shaft at each end of the chamber, links connecting the posts to the adjacent shaft, separate screw means operatively connected to each shaft for rocking the same, a cross shaft connecting said screw means, and gearing whereby the shafts may be rocked simultaneously by either screw means.

10. Glass drawing apparatus comprising a drawing chamber, a floater therein, depressing means at each end of the floater, means for actuating each of the depressing means, and a common drive for the actuating means extending across the drawing chamber whereby the depressing means may be separately operated from either end of the chamber.

11. Glass drawing apparatus comprising a drawing chamber, a floater therein, depressing means at each end of the floater, means for actuating each of the depressing means, and a common drive for the actuating means extending across the drawing chamber whereby the depressing means may be simultaneously operated from either end of the chamber.

12. Apparatus for depressing a floater for glass drawing comprising a depressing device at each end of the floater, screw means for separately operating the depressing devices and a cross shaft joining the several screw means whereby the depressing devices may be separately operated by either screw means.

13. Apparatus for depressing a floater for glass drawing comprising a depressing device at each end of the floater, screw means for separately operating the depressing devices and a cross shaft joining the several screw means whereby the depressing devices may be simultaneously operated by either screw means.

14. Glass drawing apparatus comprising a drawing chamber, a floater therein, depressing means on opposite sides of the chamber extending therein and engaging the floater, and means for adjusting the depressing means simultaneously.

15. Glass drawing apparatus comprising a drawing chamber, a floater therein, depressing means on opposite sides of the chamber extending therein and engaging the floater, and means for adjusting the depressing means simultaneously from either side of the chamber.

16. Glass drawing apparatus comprising a drawing chamber, a floater therein, depressing means on opposite sides of the chamber extending therein and engaging the floater, and means for adjusting the depressing means on either side of the drawing chamber from either side of the drawing chamber.

In testimony whereof we have hereunto set our hands.

LONNIE J. PIERCE.
FREDERIC L. BISHOP.